April 10, 1956  H. W. BIGGE  2,741,489
LOAD CARRYING VEHICLE
Filed June 1, 1953  7 Sheets-Sheet 1
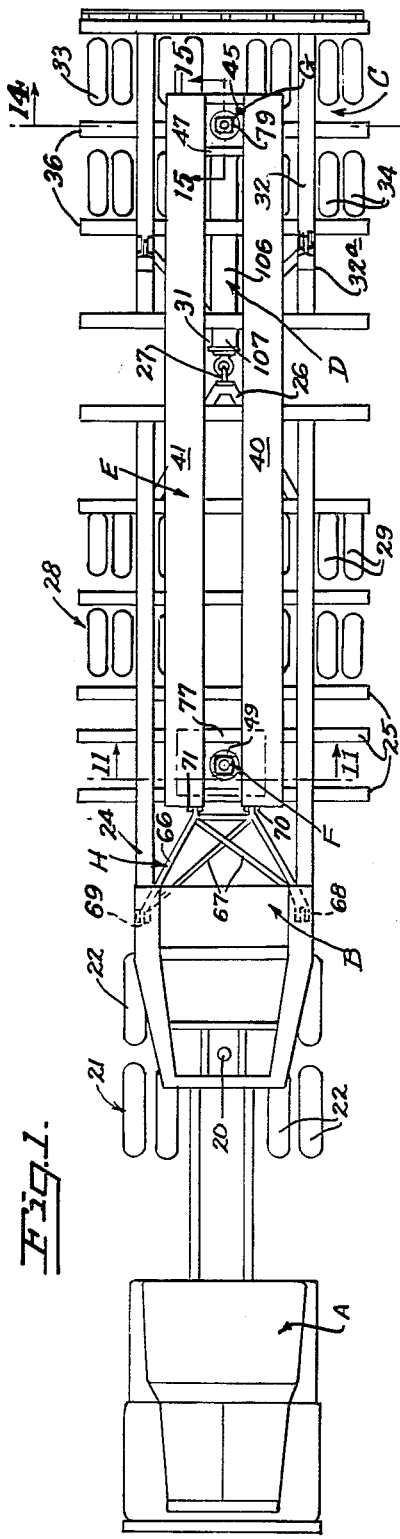
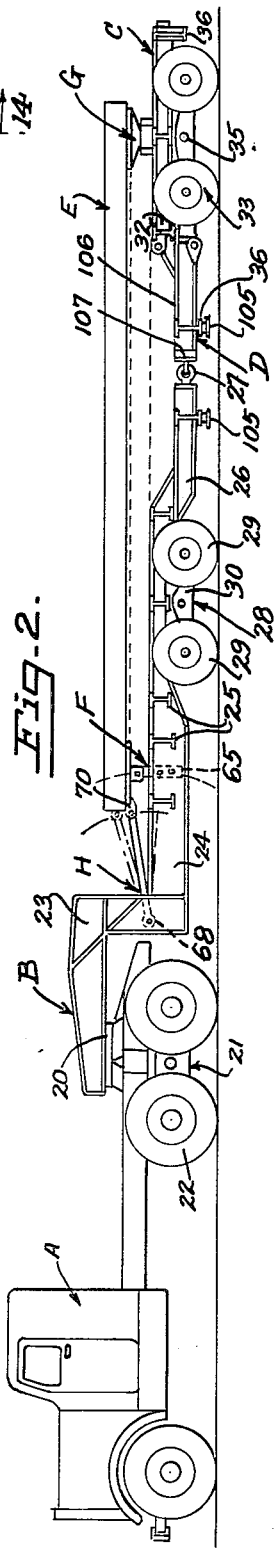
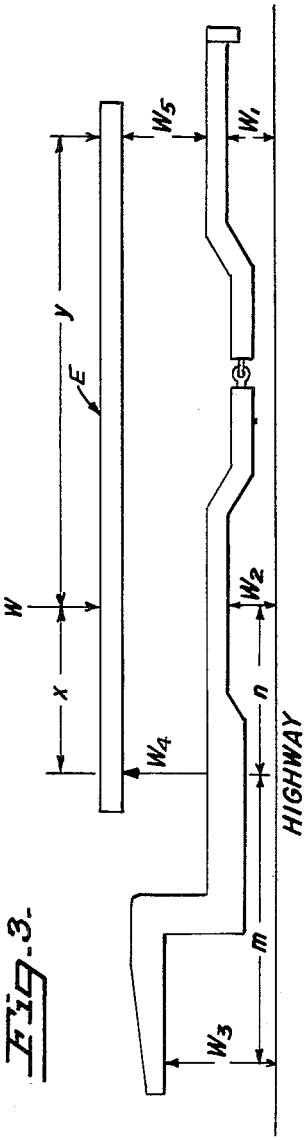
INVENTOR.
HENRY W. BIGGE
BY
ATTORNEY

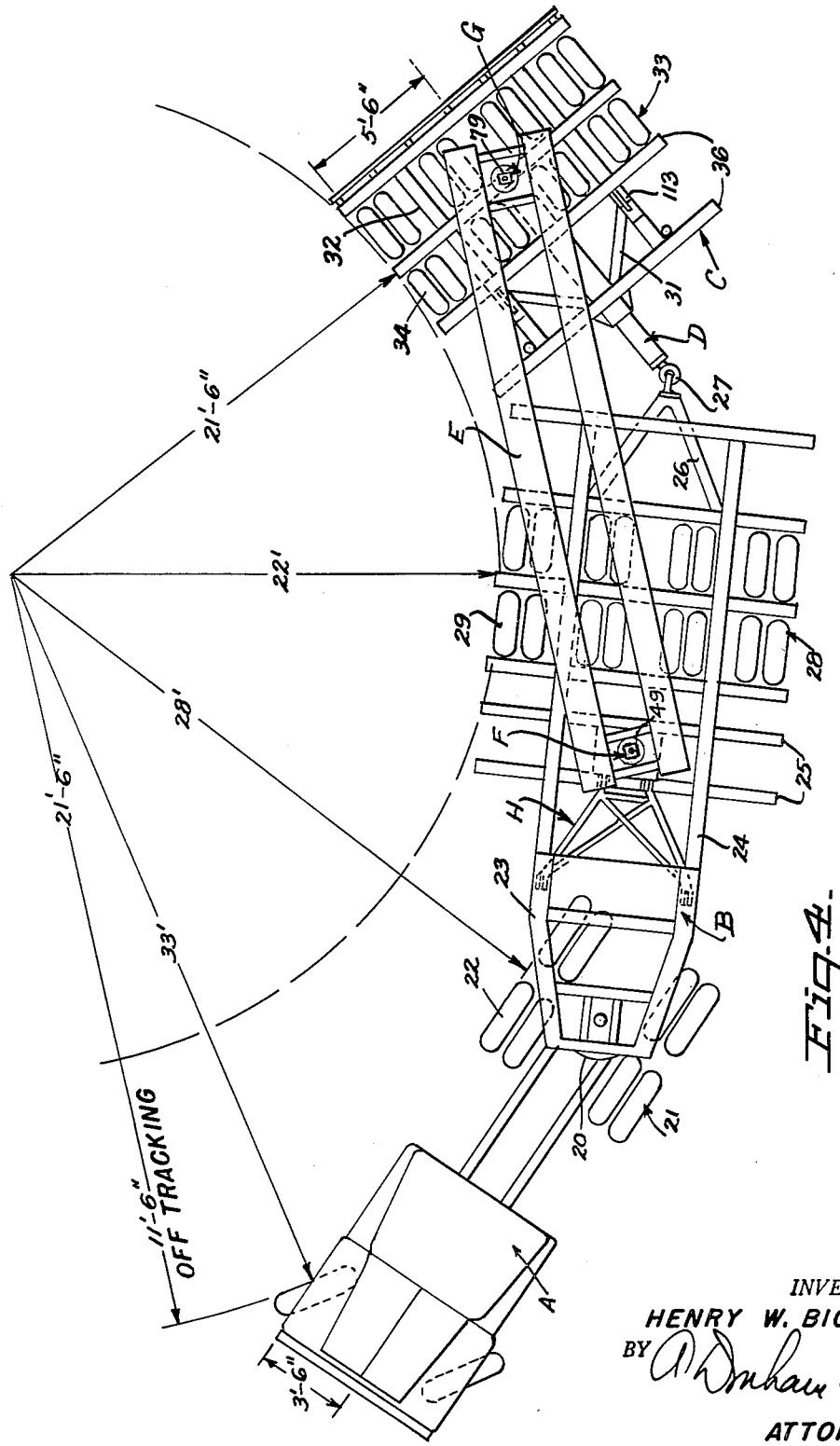

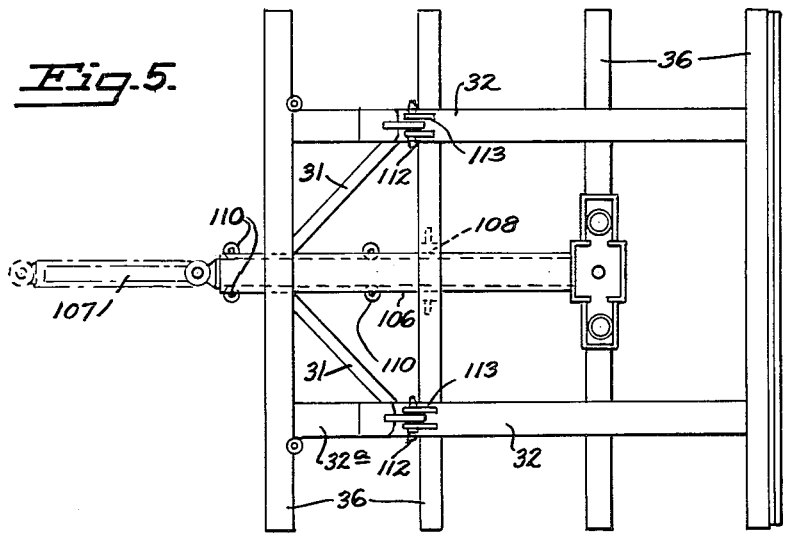
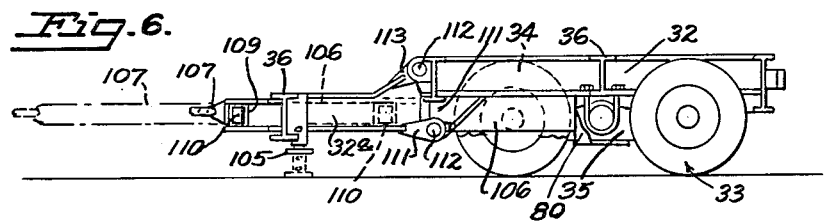
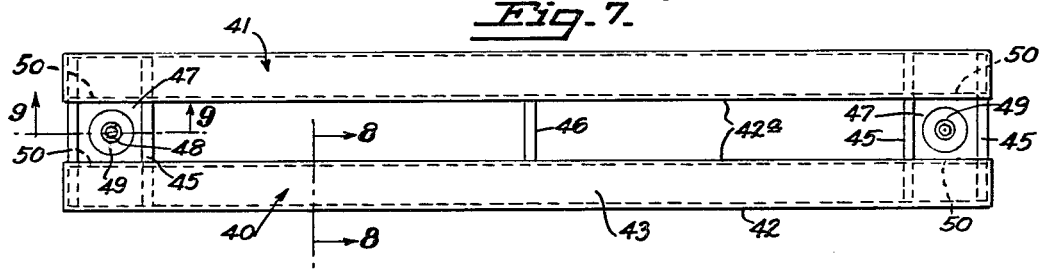
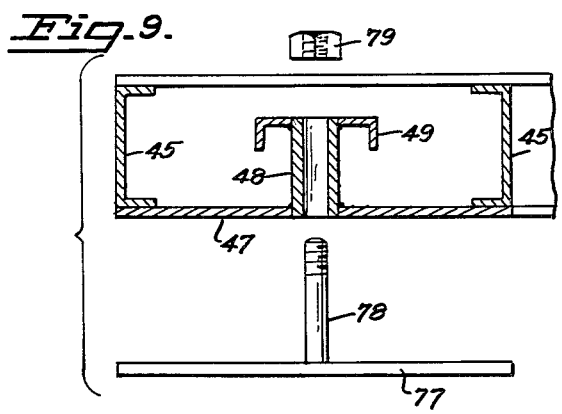
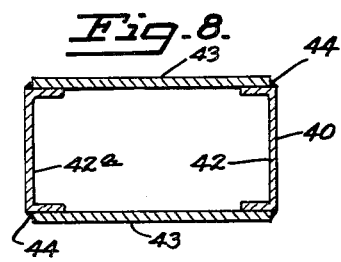
INVENTOR.
HENRY W. BIGGE
ATTORNEY

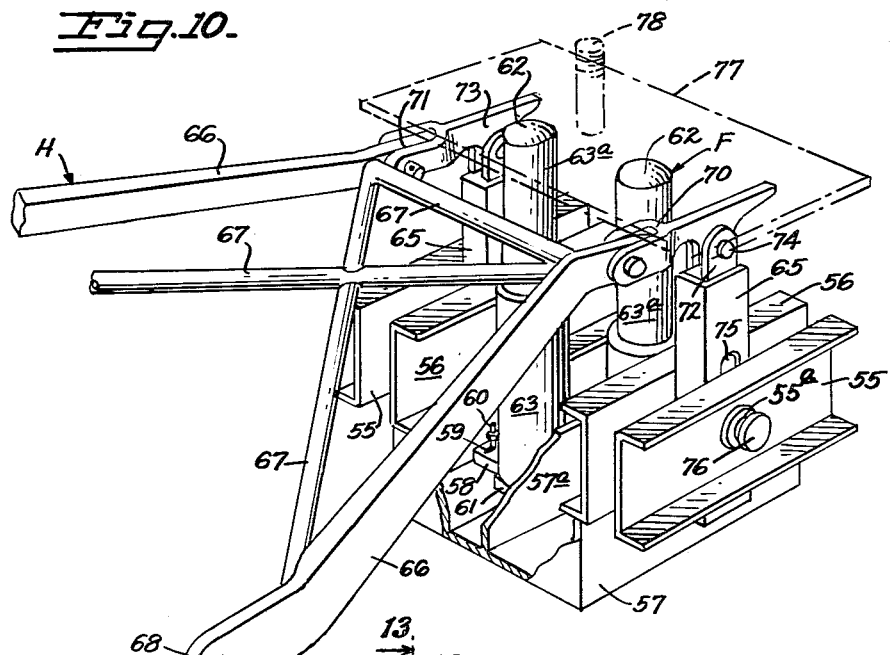
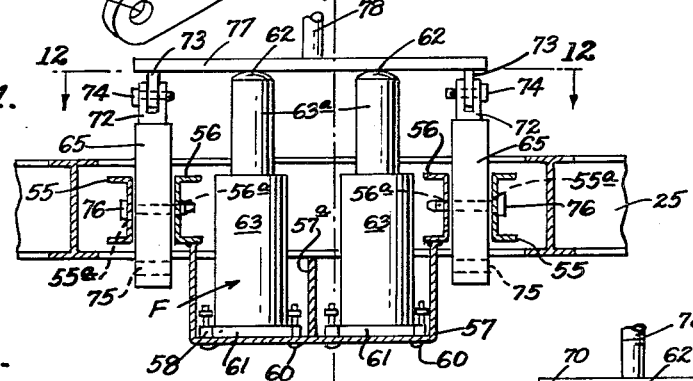
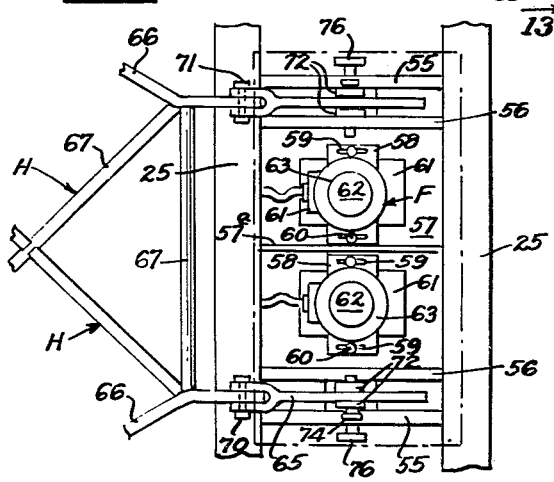

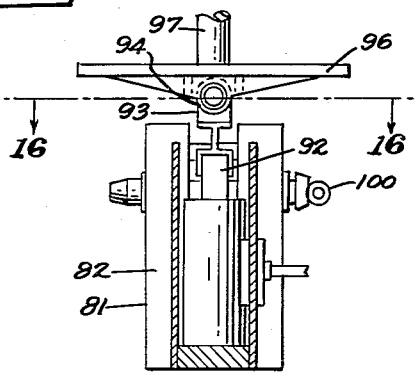
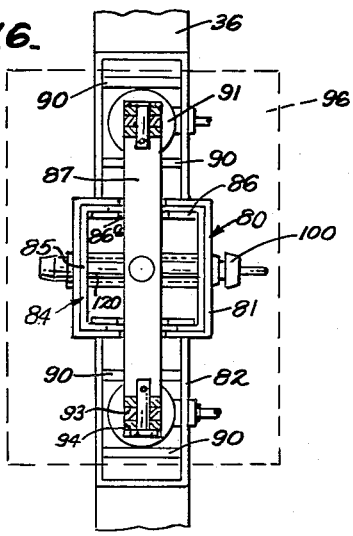
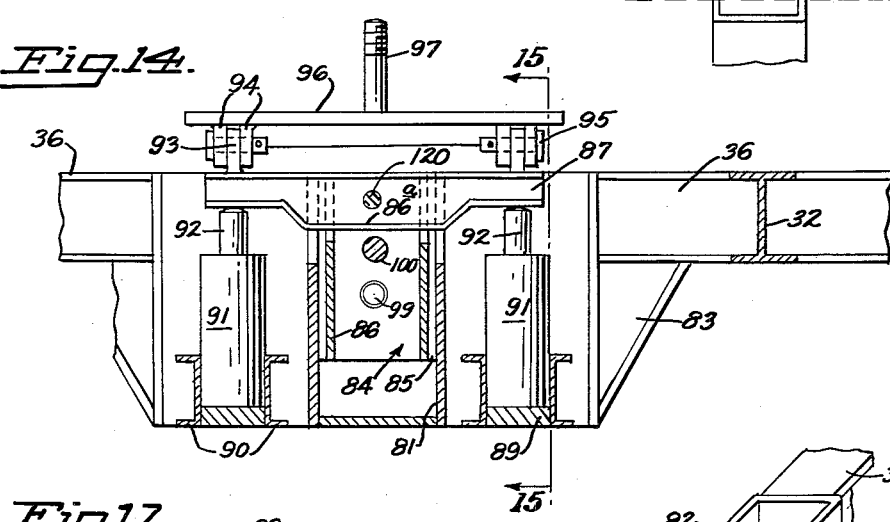
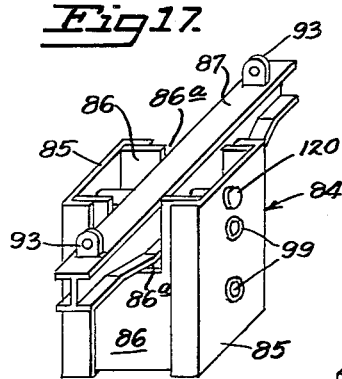
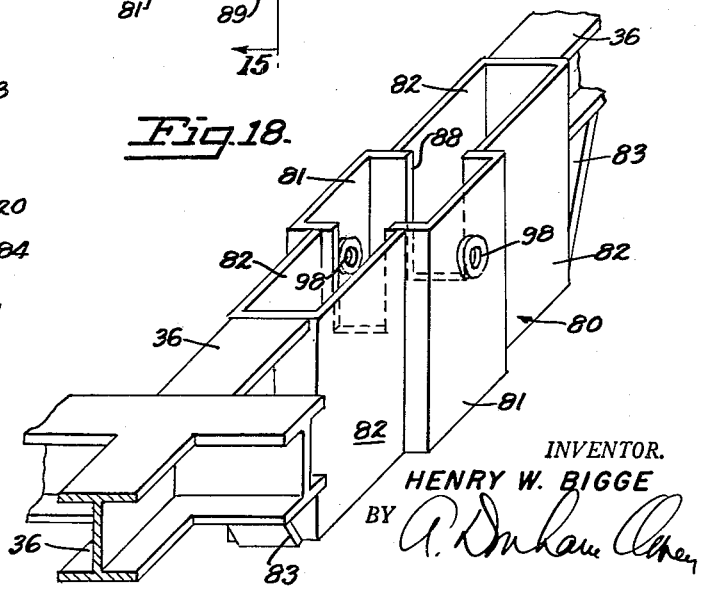

April 10, 1956 — H. W. BIGGE — 2,741,489
LOAD CARRYING VEHICLE
Filed June 1, 1953 — 7 Sheets-Sheet 6

INVENTOR.
HENRY W. BIGGE
BY
ATTORNEY

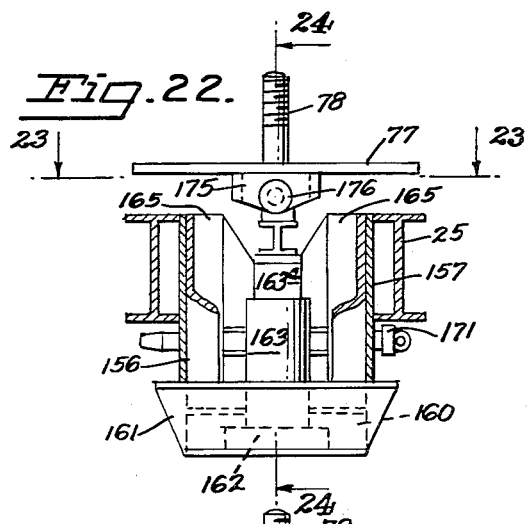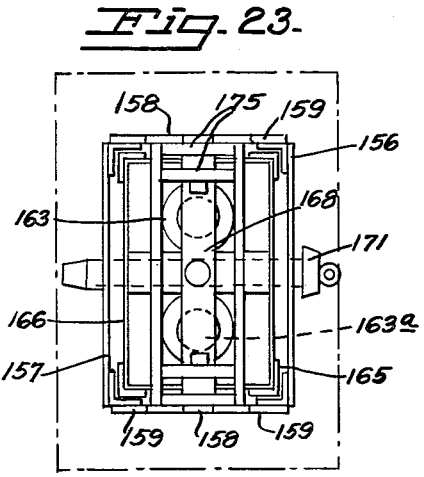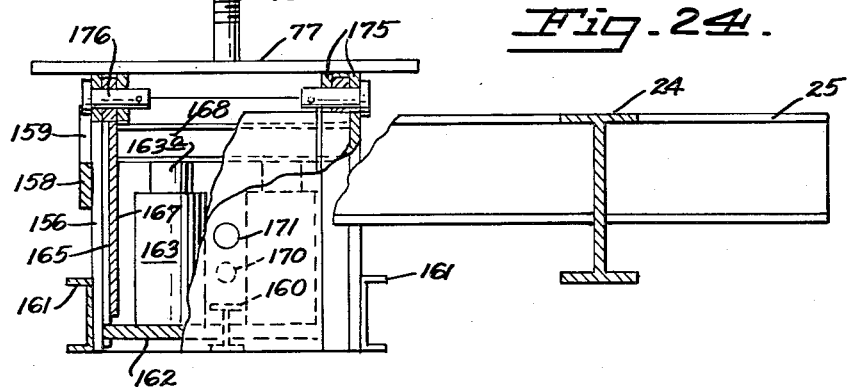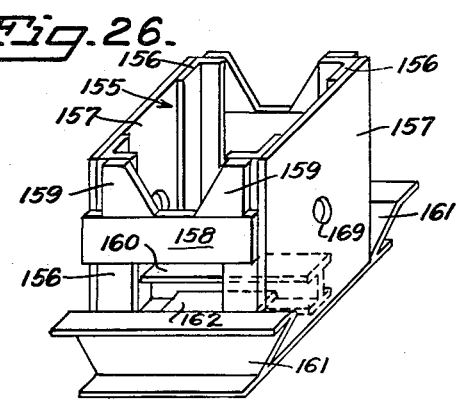

United States Patent Office 2,741,489
Patented Apr. 10, 1956

2,741,489

LOAD CARRYING VEHICLE

Henry W. Bigge, Oakland, Calif.

Application June 1, 1953, Serial No. 358,661

15 Claims. (Cl. 280—44)

This invention relates to heavy load carrying vehicles of the type designed to be pulled by a tractor truck, and has particular application when the load to be carried is a unit mass in the range of 60,000 pounds and above.

Modern technological advance has required that many extremely heavy pieces of equipment be transported for relatively long distances on public highways. For example, massive pipe sections used in large capacity pipe lines, heavy chemical reaction towers, earth movers and so on, all must be moved to construction areas over substantial stretches of highway. For this reason nearly all of the States and most cities have enacted legislation regulating the allowable weight, length, width, and type of load that may be carried on their various highways and streets, so that the highway surfaces will not be crushed, cracked or otherwise damaged. Moreover, the transporting of massive new military devices such as atomic artillery, heavy guided missiles, rockets and the like has indicated a further need to protect present highways never intended to carry such loads.

Most States have adopted highway weight distribution formulas which prescribe legal load limits for any particular load carrying vehicle, regulating the manner in which the load may be distributed over the pavement. For example, the usual highway load distribution formula provides a maximum load for each axle or axle cluster with a minimum spacing requirement between separate adjacent axle clusters. Many States require at least 18 feet between adjacent axles or axle clusters. To determine the maximum "pay load" the hauler must compute the allowable gross load for his vehicle under the formula and subtract from it the equipment or tare weight of the load carrying vehicle itself.

However, massive loads, out of the normal range, generally require "overload" permits, granted by the various Divisions of Highways upon occasion of necessity. These permits allow, first of all, a certain percentage overload above the customary legal limit based on the weight distribution formula. The hauler must still comply with the distribution formula, but by agreeing to travel only on certain roads and at certain times he is able to carry a percentage overload. Additional consideration is granted if an axle has more than the usual four tires. Finally, another permit is granted if the track of these added tires is greater than the legal width thus distributing the load stresses over an even greater area of roadway.

With the heavy semi-trailer rigs now in use it is practically impossible to distribute the weight of a massive piece of machinery, such as a 50 ton steam shovel, so that an overload permit may properly be granted in compliance with such State weight distribution formulas. The problem is not the total weight or size of the load, but the inability to properly distribute its weight. Even if present devices readily permitted the center of load to be positioned squarely between two separate, spaced axle clusters, the distributed weight on a single cluster would still exceed legal limits. In practice, however, the load must be positioned wherever the carrying structure permits, so that an even greater proportion of the load falls on a single axle cluster, with a consequent overburdening of the highway crust at a point directly below.

Another problem is the over-all length of the carrying vehicle. Preferably the vehicle should be of minimum length to facilitate maneuverability and to comply with State statutes. However, the usual semi-trailer has an upwardly extending, goose-necked connection with the fifth wheel of the truck which requires a longer semi-trailer than normal to permit any attempt at weight distribution. Consequently, the heavy hauler often faces the dilemma of improper weight distribution or excessive length.

Another concern of the hauler is the height of the carrying bed. The problem, in general, is to keep the bed as low as possible to facilitate the lifting operation necessary to place the load on the carrying vehicle. It is apparent that the higher the bed the greater the effort expended in loading the cargo. This problem is particularly troublesome when handling massive crawler rigs, such as track-mounted steam shovels, where, normally there is no available equipment capable of hoisting them aboard. Generally, these rigs proceed onto "low bed" carrying vehicles under their own power.

Another problem is that of maneuverability. Preferably, the turning radius of the load carrying vehicle should permit it to negotiate ordinary turns with the semi-trailer portions tracking as nearly as possible in the turning path of the tractor truck. However, proper weight distribution is gained only by excessive length in the conventional semi-trailer rig with the trailer, tracking inside the truck. This improper tracking hampers movement in heavily traveled areas and also causes major problems of traffic disruption. Likewise, reversing the vehicles is rendered extremely difficult.

Another problem stems from the tare weight of the load carrying structure itself. The greater the trailer length the greater the equipment weight and the smaller the "pay load" that may be carried as a legal weight under the existing State laws.

The present invention is directed to a solution to all these and other problems as will appear, and one object is to provide a vertically movable load carrying beam that is independently supported and pivotally connected at each end to separate wheeled undercarriage portions. The beam may be loaded in a lowered position for proper weight distribution, and then raised free of the undercarriage portions for independent movement during actual load carrying motion of the undercarriage.

Another object of this invention is to provide a unitary structure for accomplishing both the functions of vertically moving the load carrying beam with respect to the undercarriage portions and horizontally and vertically pivoting the beam on the separate undercarriage portions.

Another object of this invention is to provide steering means between the various undercarriage portions to provide maximum maneuverability and steerability and particularly to insure that each portion will track as nearly as possible in the path of the truck pulling the load. This makes it possible for the combined units to move through city traffic and to negotiate 90° turns at ordinary street corners without disrupting or displacing any other traffic.

Another object of this invention is to keep the over-all height of the load carrying structure to a minimum in order to reduce the energy expended in raising the load to a carrying position.

Another object is to reduce the over-all length of the load carrying structure so that it will comply with legal load limits without exceeding length limitations.

Another object is to provide an undercarriage structure that is relatively flat throughout its length and which is without upward protuberances that interfere with the positioning of the load.

Other objects and advantages of the invention will be apparent from the following description and from the drawings in which:

Fig. 1 is a plan view of a novel load carrying vehicle according to the present invention, with certain details being omitted for the sake of clarity;

Fig. 2 is a view in side elevation of Fig. 1;

Fig. 3 is a diagrammatic view of the load carrying structure, illustrating weight distribution with respect to the highway;

Fig. 4 is a plan view of the load carrying combination of the present invention showing the relative positions of the various members when the combination is in the process of making a sustained curve about a common turning center;

Fig. 5 is a plan view of a form of dolly frame that may be used in the load carrying device, showing a telescoping steering connection;

Fig. 6 is a view in side elevation of the dolly, with one of the wheels broken away to reveal the structure underneath;

Fig. 7 is a plan view of the novel load carrying beam of this invention;

Fig. 8 is an enlarged view in transverse section along the line 8—8 of Fig. 7;

Fig. 9 is an enlarged exploded view of a vertical beam pivot, with the view of the beam corresponding to a view in longitudinal section along the line 9—9 of Fig. 7;

Fig. 10 is an isometric view, broken away in part, of one form of a beam elevating device for use on the jeep portion of the present invention, showing the associated jeep radius arms, and with the jeep structure removed for the sake of clarity;

Fig. 11 is a view in transverse section along the line 11—11 of Fig. 1, with parts in elevation;

Fig. 12 is a view in horizontal section along the line 12—12 of Fig. 11;

Fig. 13 is a view in longitudinal section along the line 13—13 of Fig. 11;

Figure 14 is a view in transverse section along the line 14—14 of Fig. 1 of another form of beam elevating device for use on the dolly portion of the present invention;

Fig. 15 is a view in vertical section along the line 15—15 of Fig. 14;

Fig. 16 is a view in horizontal section along the line 16—16 of Fig. 15, with parts in elevation;

Fig. 17 is an isometric view of the slide portion of the elevating device of Figs. 14 to 16;

Fig. 18 is an isometric view similar to Fig. 17 of the guide portion of the elevating device;

Fig. 22 is a view in longitudinal section of a modified form of a beam elevating device for use on the jeep portion of the present invention, with parts in elevation;

Fig. 23 is a view in horizontal section along the line 23—23 of Fig. 22;

Fig. 24 is a view in transverse section along the line 24—24 of Fig. 22, with parts in elevation;

Fig. 25 is an isometric view of the sliding portion of the modified elevating means illustrated in Figs. 22 to 24; and Fig. 26 is an isometric view similar to Fig. 25 of the guide portion of the modified elevating means.

Figure 19:
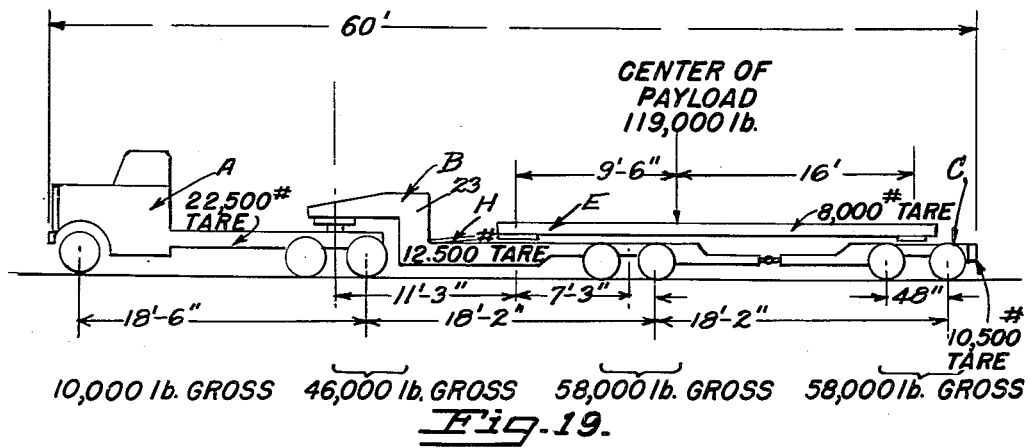
Fig. 19 is a view in side elevation, on a reduced scale, of the load carrying vehicle of the present invention, indicating allowable gross loads for each axle cluster and also the total allowable gross load.

Taking an over-all view of the flexible beam load carrying vehicle of the present invention, it may be said to include a motor driven tractor A; a jeep B pivotally connected to the fifth wheel 20 of the tractor; a dolly C pivotally connected to the jeep by means of a telescoping steering connection D; a vertically movable load carrying beam E pivotally mounted at either end on elevating means F and G carried by the jeep and dolly, respectively; and a beam stabilizer H cooperating with the elevating means F and G.

The tractor A may be of any standard design normally adapted for heavy load carrying duties. The tractor illustrated has a rear axle cluster 21, with a plurality of wheels 22, designed to support a considerable load.

The jeep B is attached to the tractor A in a conventional manner by the humped goose neck 23 having a pivoted connection with the tractor fifth wheel. Preferably, the jeep B is constructed of open spaced I beams to reduce weight without losing structural strength. The jeep illustrated has main frame members 24 supporting a plurality of transverse loading beams 25 having upper surfaces flush with the wheels 29 (Figs. 1, 2, and 4).

The jeep frames 24 are supported by an axle cluster 28 having a plurality of wheels 29. The axle cluster 28 is pivotally connected to the frame 24 by conventional walking beams 30 so that the jeep is free to pivot on a horizontal axis with respect to the wheels 29. Connected to the rear ends of the main frames 24 are underslung beams 26 terminating in a steering ring connection 27.

Connected to the steering ring 27 by means of the telescoping reach D is the dolly C. The dolly C includes a dolly frame supported by an axle cluster 33 having a plurality of wheels 34. The dolly frame constitutes a second loading platform and comprises transverse beams 36 preferably flush with the upper surface of the wheels 34, and main frames 32 (Figs. 5 and 6). The axle cluster 33 is likewise mounted for a horizontally pivoted motion with respect to the dolly frame by walking beams 35.

The dolly C supports the telescoping reach D by means of an underslung frame support 31, 32a. Preferably the dolly C and the underslung frame support are separate units so that they may be rigidly connected during load carrying operations, but may be taken apart and loaded sideways on the jeep during empty runs of the load carrying vehicle.

These separate frame portions may be conveniently coupled together by a pair of forked joints 111, 113 between upper and lower portions of each of the opposing frame members 32, 32a, as best seen in Figs. 5 and 6. This construction assures the necessary rigidity between the separate frame portions while permitting rapid uncoupling by removal of the coupling pins 112.

Supported on the jeep B and dolly C by the elevating means F and G, respectively, is the load carrying beam E (Figs. 7 to 9). The beam comprises two main members 40 and 41 which may be constructed of side channel members 42, 42a and top and bottom plates 43 secured to the side members in any suitable manner, as by corner welds 44. The innermost channel members 42a are shorter than the outer members 42, leaving a space for transverse channel members 45. The beam may be further strengthened by additional cross bracing, such as I beam 46, suitably secured between beam members 40, 41. Centrally apertured cross plates 47 are rigidly attached to each end of the beam, adjacent the lower sides of the cross channel members 45. Secured in the apertures are pivot bearings 48, which are held rigidly in place by cross channel members 49 which, in turn, are secured to plates 50 closing the inner gap between channel members 42a and 45.

Despite the very sturdy construction of the jeep B, dolly C, and load carrying beam E, allowing the support of massive loads, the equipment weight is considerably reduced by the open construction utilized. Consequently, the pay load is increased over that normally provided by flat bed constructions for heavy duty semi-trailers.

As previously noted the beam E is supported on the jeep and dolly by the elevating means F and G, respectively. The elevating means may take any desirable form, such as a mechanical jack or worm screw, but is shown for purposes of illustration as a hydraulic jack. Figs. 10 to 13 illustrate one possible form of the hydraulic jack F mounted on a central portion of the jeep structure.

The elevating means F is supported between two of the jeep cross beams 25 by a housing 57, which is rigidly welded to the cross beams and to the innermost channels 56 of a pair of spaced apart channels 55, 56. The housing may be further strengthened by a cross member 57a. Supported on the floor of the housing for limited pivotal movement by half-round members 58 are two hydraulic jack cylinders 63 and pistons 63a. The jack cylinders are rigidly secured to upper planar surfaces of the half-rounds 58; while a pivoted motion of the jack cylinders is permitted by the rounded lower portions of the half-rounds rolling against the floor of the housing. The jack cylinders are loosely secured in the housing by long headed bolts 60 extending through elongated slots 59 in the half-rounds 58 and are supported and cushioned in their pivoted movement by resilient blocks 61 positioned under overhanging portions of the cylinder 63, as best seen in Fig. 13.

Supported to move vertically on rounded upper surface 62 of the pistons 63a is a fifth wheel or swivel plate 77 provided with a centrally positioned vertical pivot pin 78. One end of the beam E is mounted on the pin 78 by means of the pivot bearing 48 and nut 79, as shown in Fig. 9. The other end of the beam is mounted on the dolly C by the elevating means G to be later described.

The swivel plate is held in position on the rounded tops 62 of the pistons 63a by means of a beam stabilizer H and support blocks 65. The beam stabilizer H comprises a rigid frame, including radius arms 66 and bracing members 67, that is pivotally connected at its ends to the jeep goose neck 23 and swivel plate 77 by forked joints 68, 69 and 70, 71, respectively. The function of the beam stabilizer H is to hold the beam E substantially parallel to the jeep frame, and to permit a slight fore and aft movement of the swivel plate 77 and beam with respect to the elevating piston 63a, regardless of the extent of elevation of the beam E. This movement is best illustrated by the dotted line positions of the stabilizer H in Figs. 2 and 13, and occurs as the beam is raised or lowered or as the swivel plate 77 rocks due to irregularities in the road bed.

To allow the hydraulic pressure holding the beam in elevated position to be released during carrying operations, support blocks 65 are provided. These blocks also aid in the further stabilization of the swivel plate 77 and the beam E. As best seen in Fig. 10, the blocks 65 are provided with apertured brackets 72 which cooperate with the plate brackets 73 and pin 74 to provide a pivoted connection between the swivel plate 77 and the blocks. As a result, the blocks 65 are free to slide up and down between the channels 55, 56 as the beam elevating jacks are actuated. The blocks are further provided wtih a series of apertures 75 to receive a support pin 76 so that when the apertures 75 are lined up with corresponding apertures 55a, 56a in the channels 55, 56, the pin 76 may be inserted and the hydraulic pressure released.

It will be observed that the hydraulic jacks 63 and the supporting blocks 65 both have pivoted connections to the swivel plate 77 and the jeep frame; the jacks at 62 and 58 and the blocks at 74 and 76, respectively. The pivotal movement of these members is limited, however, by the beam stabilizer H, previously described, and by the beam E so that the amount of fore and aft movement allowed to the swivel plate is just enough for the purpose described.

The mounting described also provides a horizontally pivoted mounting for the swivel plate at 62 and 74, while the pin 78 provides a vertically pivoted mounting for the beam E. In this way, a modified universal connection exists between the front end of the beam E and the jeep B, with the hydraulic jack mechanism F constituting an elevating means for the front beam end.

A similar connection is provided between the rear end of the beam E and the dolly C, and a particular elevating device G is illustrated in Figs. 14 to 18. This mechanism functions somewhat differently from the elevating means F, just described, since the beam E is not maintained parallel to the undercarriage, but is free to rock sidewise with respect to dolly C. Also, the mounting is structurally different, utilizing only one cross beam 36 for support and having the hydraulic cylinders supported outside the guide.

As shown (Fig. 18), the guide 80 comprises a central hollow rectangular member 81, with smaller, three-sided members 82 adjacent either side thereof, the whole being mounted intermediate a single dolly cross beam 36. Supporting angles 83 strengthen the guide support. A hollow rectangular slide member 84 (Fig. 17) is adapted to slide within the central portion 81 of the guide 80. The slide 84 comprises transverse channel members 85 and side plates 86 having rectangular slots 86a for a relatively movable cross member 87. The cross member 87 is mounted within the guide 84 for limited rotation about a supporting shaft 120 rigidly secured to the channels 85. The amount of cross member rotation relative to the slide depends on the depth of the slots 86a, since the rotative movement of the cross member 87 will stop when its bottom contacts the bottom of either slot 86a.

Portions of the central guide member 81 are cut away, as at 88, to allow free movement of the slide cross member 87 relative to the guide 80. Supported in the bottoms of outer guide members 82, on plates 89, and supporting channel members 90, are hydraulic cylinders 91 and pistons 92 engaging the cross member 87. Upwardly extending brackets 93, downwardly extending pairs of brackets 94, and pins 95 provide a horizontal pivot for the swivel plate 96 and its vertical pivot pin 97, mounting the rear end of beam E in similar fashion to the previously described swivel plate mounting 77. Likewise, the guide member 81 and slide channels 85 are provided with pin apertures 98 and 99, respectively, so that the slide may be locked in position in the guide by means of the pin 100 (Figs. 14 to 16).

By the above described construction, it is clear that both the front and rear ends of the beam E may be elevated or lowered simultaneously or independently, since either end of the beam and its associated swivel plate is free to pivot horizontally on the pins 74 and 95 with respect to the elevating means. Also, the pivoted connections in the beam stabilizer H and support blocks 65 easily compensate for any fore and aft displacement of the beam resulting from such independent movement, and thereby permit the beam E to be maintained at varying fixed angles to the horizontal, should this be desired. Likewise the undercarriage may be turned independently of the beam E because of the pivoted movement permitted by vertical pivots 78 and 97. Combining these movements into the swivel plates 77 and 96 allows a generally smooth movement of the load carrying beam E over the roadbed, despite a twisting or uneven movement of the undercarriage or varying elevations of the beam E.

In addition, the beam stabilizer H, at the front end of the beam, and the rear slide shaft 120 provide a three point beam suspension that compensates for the normal variations in horizontal alignment between the jeep and dolly axles, which are an inescapable incident of highway travel. As a result, deviations in the highway surface, causing the jeep B and dolly C to tilt in opposite directions, will not develop torsional stresses in the beam E since the dolly is free to pivot relative to the beam about the shaft 120. The beam E is horizontally stabilized with respect to the jeep, however, by the cross bracing of the beam stabilizer H. This construction permits a wide range of operating conditions with maximum protection from beam stresses.

Figure 21:
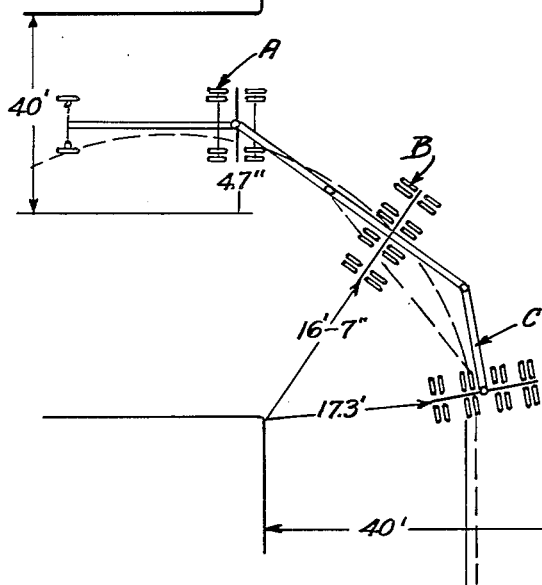
Fig. 21 is a diagrammatic plan view showing the positions of the vehicle of Figs. 20 and 21 while making a sharp right angled turn.

The operation of the load carrying vehicle can best be described in relation to a typical load carrying problem. For example, suppose it is desired to transport a pile-driving crawler rig, such as is represented in Fig. 21. The initial problem is getting the load off the ground onto the load carrying frame.

Because the wheels 29 and 34 are positioned between and flush with the cross beams 25, 36, it is only necessary to raise the crawler rig as high as the tops of the tires supporting the jeep and dolly. In the case of standard 8:25–15 truck tires this height is not over 33 inches, requiring considerably less loading energy than is normally required. This is true regardless of the type of load, and regardless of whether it is loaded by hoists or under its own power. However, the sturdy construction of the transverse beams 25 and 36 allow the crawler rig to be driven up a ramp directly onto the beams.

It is noted that the beams 25, 36 closest to the telescoping reach are depressed somewhat to prevent their hitting the underside of the beam E when the vehicle is passing over the crest of a hill, for example. In loading crawler rigs, it would be necessary to bridge this gap by wooden beams of suitable size or other appropriate means.

The crawler rig may proceed along the cross beams until its center of mass is positioned as desired above the load carrying beam. The center of mass of the load may be determined in any of the usual ways, such as mathematical computation; but for a crawler rig it is most easily determined by driving the rig onto a log or other object providing a fulcrum and observing the point at which it falls over. During the loading operation, additional support may be provided by utilizing retractable legs 105 for the jeep and dolly, as shown in full and dotted line positions in Fig. 6 and also in Fig. 2.

Once the load is positioned, the elevating means F and G are energized to lift the load off the loading cross beams 25 and 36. In the case of a crawler rig, the beam E contacts the main crawler frame supporting the tracks which are normally spaced a substantial distance apart. Of course, many loads, such as platform supported loads, may be loaded directly onto the beam E before it is elevated. Consequently, the lowered position of the beam E (dotted lines Fig. 2) is of prime importance during loading due to the minimum effort required to move the load onto the rig. Once positioned the load may be lifted free of the running gear to the desired traveling position.

Another advantage of the vertically movable beam E is that the vertical clearance can be varied, somewhat, to allow passage of the load under an overhead construction while traveling. This could be of great importance in obtaining a permit for a particular routing desired by the carrier.

The beam elevation necessary to free the running gear need only be 5 to 10 inches, although the range of movement should be sufficient to accommodate varying type loads. Once the beam is elevated, the load is free to ride suspended on the two swivel plates 77 and 96, supported by the elevating means F and G on the jeep and dolly respectively.

Fig. 4 illustrates the movement of the load carrying beam relative to the running gear and also the small amount of off tracking resulting from the unique gear employed. The truck, jeep, and dolly wheels are shown in the positions that result if a sustained turn of minimum turning radius is made about the common center point. The distances shown were determined with reference to a standard tractor having a turning radius for its rear axle cluster of 28 feet with respect to a 33 foot turning radius of the front axle.

In these positions it was observed that the turning radii of the jeep and dolly are substantially equal and only about 6 feet smaller than that of the rear axle cluster 21 of the tractor itself. However, almost one third of this amount is attributable to the increased axle width of the jeep and dolly axle clusters 28 and 34. The total off-tracking is approximately 11.5 feet, or only 9.5 feet taking into account the increased axle width of the load carrying jeep and dolly.

These desirable tracking characteristics are due primarily to the unique positioning of the load carrying beam E with respect to the undercarriage jeep B and dolly C. As may be observed in Fig. 4, both the jeep and dolly are steered by the vehicle directly ahead of it, but the beam E provides a towing connection between the jeep and dolly that is separate from the steering connection D. Moreover, the pivoted beam member E follows a different independent path from the undercarriage which allows free movement of the load about a turn regardless of where the load is positioned on the beam E.

It is apparent that the straight line towing distance between the elevating means F and G will always equal the length of the beam E; whereas, the steering distance from the elevating member F to the steering coupling 27 to the elevating member G will vary depending on the position of the undercarriage, equaling the straight line distance only under conditions of straight travel, as in Fig. 1. To compensate for this variance, a telescoping reach D is provided (Figs. 1, and 4 to 6).

The telescoping steering connection is shown by way of illustration as a hollow rectangular guide 106 supported under the dolly C by means of the detachable, underslung frame 31, 32a, and a U-shaped bracket 108 depending from one of the dolly cross beams 36. Connected to the jeep steering ring 27 and adapted to slide in the guide 106 is the rectangular reach 107. Rotatably attached at spaced points along the guide 106 and extending inwardly through small rectangular openings 109 are guide rollers 110 which serve as guide bearings for the reach 107.

In operation, the reach 107 slides easily in the guide 106 due to the roller contact, and compensates for variations in the vehicle length. A similar roller arrangement may be provided, should unusual dipping of the steering connection in a vertical direction be contemplated, by providing additional guide rollers 110 rotatable on horizontal axes at the top and bottom of the guide.

The unique construction and positioning of the load carrying beam E permits a massive load to be distributed over the highway strictly in accordance with state overload permits or load distribution formulas. As will be observed in Figs. 2 and 3, any load on the beam E will be transmitted to the axle clusters 22, 28, 33 only through the two elevating means F and G. As a result, a load may be placed at different positions on the beam without changing the ratio of the load carried by the truck axle cluster 21 to the jeep axle cluster 28. Of course, the proportionate load carried by each will vary with the change in the center of loading, but the ratio will depend solely on the respective distances between the axle clusters and the elevating means F.

This fact may be demonstrated algebraically with reference to Fig. 3. In that figure, W represents the resultant weight component of the load being carried; while $W_4$ and $W_5$ represent the portions of the load W transferred to the jeep B and dolly C through the elevating means F and G, respectively. $W_1$, $W_2$, and $W_3$ represent the portions of the load W transferred to the highway through the axle clusters 33, 28, and 21, respectively. The letters $x$ and $y$ represent the distances between the center of load at W and the pivotal connections at F and G, respectively. Similarly M and N represent the average distances of the axle clusters 21 and 28 from the fulcrum point about $W_4$.

Expressed algebraically, the portions of the total load W transferred to the pavement by the respective axle clusters may be stated as follows:

$$W_1 = W_5 = \frac{x}{x+y}W$$

$$W_2 = \frac{my}{(m+n)(x+y)}W$$

$$W_3 = \frac{ny}{(m+n)(x+y)}W$$

$$W_4 = \frac{y}{x+y}(W)$$

From these formulas it is apparent that the ratio $W_2:W_3$ is the same as $m:n$. It may be further shown that if $m=n$ and $y=2x$, one-third of the total load will be distributed equally on each of the axle clusters 21, 28, and 33. In practice, however, it may be desirable to vary these distances to put a greater proportion of the weight on the jeep and dolly axle clusters, relieving somewhat the burden on the rear axle cluster of the tractor.

It is evident that the underslung steering connection D and the flat, vertically movable beam E provide a load carrying structure without the usual goose-necked connections between semi-trailers. Consequently, an entirely new mode of weight distribution is possible since there are no annoying humps behind which the load must be spaced.

In conventional rigs the hump presented by the usual goose-necked trailer connection prevents proper weight distribution. To stay within the legal length, the center of loading of the trailer must necessarily be very close to the riser of the goose-neck. Obviously, few loads are of such size or shape that their centers of mass may be positioned above this center of loading without a portion of the load hitting the hump. As a result, it would be impossible to position a steam pile driver, such as the one illustrated in Fig. 20, on the usual jeep-semi-trailer combination and still retain proper weight distribution. Either the required combination would be too long, or some of its axles would carry a disproportionate load.

With the present invention, however, there are no humps presented by the underslung steering connection D or the beam E. The jeep goose-neck 23 presents no problem since the weight distribution through the beam connections F and G allows the load to be positioned rearwardly on the beam.

Figure 20:
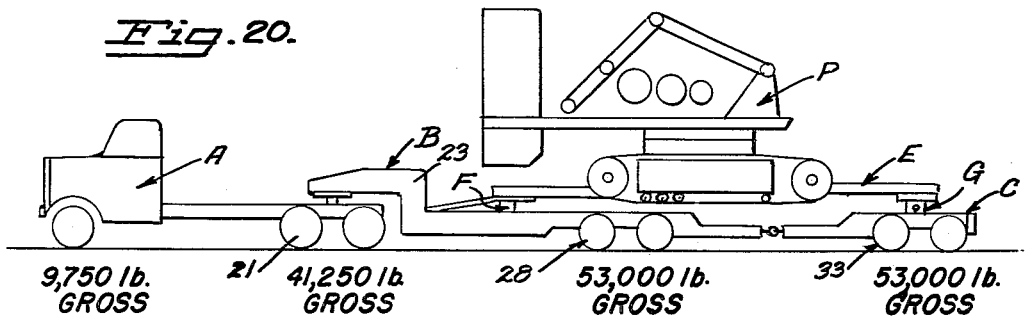
Fig. 20 is a like view showing a representative load positioned on the vehicle, and indicating the actual load transmitted to the highway by each axle cluster.

Figs. 19 and 20 illustrate a solution offered by applicant's device to an actual transportation problem with respect to a steam pile driver P, weighing 104,000 pounds. The gross weight figures indicated under each axle group in Fig. 19 are examples of weights allowed by the special permits previously mentioned. The total is 172,000 pounds gross vehicle weight. If the sum of the indicated tare weight, 53,000 pounds, is subtracted from this, a possible payload of 119,000 pounds results.

Using the load carrying rig of the present invention, the 104,000 pound pile driver is easily accommodated as shown by the actual load figures indicated under each axle group. Each of the sixteen tired axle clusters 28, 33 of the jeep B and dolly C carries a load 5,000 pounds less than capacity, while the eight tired tractor cluster 21 carries 4,750 pounds below its capacity. Such accurate distribution is easily accomplished with the present device by merely positioning the mass center of the load over a predetermined loading center of the beam E.

It has been stated before that the arrangement of turning centers on the flexible beam trailer causes the dolly to follow substantially in the tracks of the jeep. This is a noteworthy feature which gives the entire combination excellent maneuverability, with tracking altogether more satisfactory than it was with previous vehicle combinations. An indication of the turning capacity of the device is shown in Fig. 21 where a right angle turn, as would be required at a city intersection, is readily negotiated.

Figs. 22–26 illustrate a modified form for the elevating means F that eliminates the beam stabilizer H by providing a rugged guide-slide type elevating device. In this form an elevating guide member 155, shown isometrically in Fig. 26, is mounted between two cross beam members 25, as in Fig. 22. The guide member 155 includes four corner angles 156, transverse plates 157 and side bracing members 158 and 159. For added strength an I beam 160 is provided between the lower portions of the transverse plates 157. Welded to an intermediate portion of the I beam and channel members 161, closing the side gap between corner angles 156, are rectangular plates 162. Supported on the plates 162 are hydraulic cylinders 163 and pistons 163a.

Supported to move vertically on the pistons 163a is an elevating slide member 164, adapted to slide in the guide 155. The slide member 164 includes four corner angles 165, transverse plates 166, and end plates 167. Traversing the slide and rigid with the end plates 167 is an I beam 168 which is engaged by the vertically movable pistons 163a.

Each transverse guide plate 157 is provided with an opening 169. Two or more similar apertures 170 are provided in each of the transverse slide plates 166. When a pin 171 is inserted through the guide openings 169 and a particular set of slide openings 170 the slide is locked relative to the guide, the hydraulic pressure holding the guide in an elevated position may be released.

Extending upwardly from the ends of the slide beam 168 are apertured brackets 174. Cooperating with these brackets are downwardly extending pairs of similar brackets 175 which, with pins 176, form a horizontally pivoted mounting for swivel plate 77. Located centrally of the swivel plate 77 is the vertical pivot pin 78 on which one end of the beam E is mounted as before.

Unlike the preferred form of Figs. 10 to 13, no provision is made within the structure of the modified elevating device F for fore and aft movement of the swivel plate 77. Generally the need for such movement only arises when it is desired to actuate one of the devices F or G independently of the other. However, the free play between the jeep and dolly, allowed by the telescoping reach D, will fully compensate for whatever fore and aft movement is necessary when such independent movement is desired. As a result, vertical movement of the beam E remains fully as flexible as before, so that either end of the beam E may be independently or simultaneously raised or lowered with respect to the other beam end.

It will be observed that an unusual flexibility or freedom of movement has been imparted to the combination of elements making up the flexible beam trailer of the present invention. The jeep B, dolly C, and beam E are all free to perform an unending variation of movements relative to one another without detracting in any way from the accurate weight distribution and easy maneuverability of the entire combination. For example, the beam E is free to move both vertically and horizontally with respect to the undercarriage because of the combined structure of the beam stabilizer H, supporting blocks 65, and elevating devices F and G. Likewise, although the dolly C is towed by the jeep B through the beam E, the jeep and dolly are free to twist, tilt or turn independently of one another because of the combined structures and movements provided by the swivel plates 77 and 96.

In addition, the loading beam E, in combination, permits a weight distribution over the associated undercarriage that would be entirely impossible if the jeep and dolly assemblies were used separately and without the beam. Similarly, the load carrying flexibility provided by the beam would be of little use without the separate articulated structures of the jeep and dolly.

Besides facilitating proper weight distribution, the vertical mobility of the carrier beam E serves additional purposes. For example, it permits the clearance between the load and the undercarriage or between the load and an overhead obstruction to be adjusted while traveling. Also, it is an aid in loading, since a self-propelled load may be driven up onto the undercarriage frames, so that the load straddles the carrier beam. When the load has been properly positioned for proper weight distribution, the beam is raised until the desired amount of operating clearance exists between the load and the undercarriage. It will be understood that this construction is unique in the carrying of massive loads, and results in many additional advantages including those noted above.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What I claim is:

1. A low-bed load carrier comprising separate wheeled undercarriage members each having an axle cluster, steering connections between said undercarriage members, a load carrying beam pivotally connected adjacent each end to different ones of said undercarriage members, and elevating means for raising and lowering said load carrying beam above said undercarriage members, whereby the load to be carried may be positioned on the load carrying beam at any desired position, and then lifted free of the undercarriage members for movement on said beam independent of the movement of said undercarriage members.

2. The structure of claim 1 in which one of the undercarriage steering connections telescopes to allow relative movement of said undercarriage members with respect to the load carrying beam.

3. A low-bed load carrier comprising separate wheeled undercarriage members each having an axle cluster, steering connections between said undercarriage members, a load carrying beam pivotally connected adjacent each end to different ones of said undercarriage members, and separate elevating means coacting with opposite ends of said load carrying beam and capable of independent operation to raise or lower an adjacent beam end above said undercarriage members, whereby the beam may be maintained at varying angles to a horizontal plane.

4. The device of claim 3 in which at least one of said separate elevating means is movably connected to said beam to accommodate fore and aft movement of the beam caused by said independent operation of said separate elevating means.

5. The device of claim 4 wherein said movable connections comprise a half-round member providing a bottom pivot for said elevating means and a round-topped elevating member providing an upper pivot for said elevating means.

6. A low-bed load carrier comprising separate wheeled undercarriage members each having an axle cluster, steering connections between said undercarriage members, a load carrying beam pivotally connected adjacent each end to different ones of said undercarriage members, elevating means for independently raising and lowering opposite ends of said load carrying beam above said undercarriage members, and beam stabilizing means to maintain said beam in parallel relation to one of said undercarriage members when said beam is raised or lowered.

7. The device of claim 6 in which said beam stabilizing means includes jointed connections to accommodate fore and aft movement of said load carrying beam caused by independent raising and lowering of opposite ends of said beam.

8. A load carrier comprising separate wheeled undercarriage members, steering connections between said undercarriage members, a load carrying beam pivotally connected adjacent each end to different ones of said undercarriage members, elevating means for independently raising and lowering opposite ends of said load carrying beam into a supported position above said undercarriage members, and support members carried by the beam to hold the load carrying beam in an elevated position, whereby the elevating means may be relieved of their beam supporting function during load carrying operations by said support members.

9. The device of claim 8 wherein said support members include pivoted connections to accommodate fore and aft movement of said load carrying beam caused by independent movement of said separate wheeled undercarriage members.

10. A low-bed load carrier comprising a truck having a rear axle cluster; a jeep pivotally connected to said truck and having an axle cluster; a dolly having a telescoping pivotal steering connection with said jeep and having an axle cluster; a load carrying beam pivotally connected at one end to the dolly, above said dolly axle cluster, and pivotally connected at its other end to the jeep at a point between said truck axle cluster and said jeep axle cluster; whereby a unit mass load may be positioned on said load carrying beam so that its weight may be equally distributed between said truck, jeep, and dolly axle clusters while said pivotal and telescoping steering connections simultaneously insure maneuverability and tracking as nearly as possible in the path of said truck.

11. The structure of claim 10 wherein elevating means are provided for raising said load carrying beam from a loading position, flush with loading platforms on said jeep and dolly, to a carrying position above said loading platforms.

12. A carrying vehicle having a pair of independent wheel mounted frames adapted to be pulled by a wheel mounted truck means, each frame having loading beams; a load carrying beam pivotally connected at opposite ends to each of said frames and extending fore and aft along said frames; telescoping steering means between said frames so that one frame is pulled by the truck means while the other frame is pulled by said one frame; and lifting means, supporting each of said pivotal beam connections, for lifting a load resting on the loading beams off said loading beams into a carrying position on said load carrying beam; whereby a load may be positioned on the loading beams and then lifted into the carrying position with weight components of the load distributed on each of said frames and said truck means.

13. The device of claim 12 wherein said pivoted beam connections include both horizontal and vertical pivot members so that said pair of wheel mounted frames are free to twist and turn independently of one another and said beam.

14. The device of claim 12 wherein said telescoping means comprises an extending bar on the one frame and a guideway and roller means on the other of said frame.

15. A load carrying vehicle adapted to carry a massive load over public highways as it is pulled by a wheeled truck means having a rear axle cluster, comprising: a wheeled jeep member movable on and supported by an axle cluster, and adapted for pivotal engagement with a fifth wheel of said wheeled truck means; a wheeled dolly member also movable on and supported by an axle cluster, and having a telescoping steering connection with said jeep member; platform means on each of said dolly and jeep members; a load carrying beam extending lengthwise of said jeep and dolly; a rear beam lifting means supported on the axle cluster of said dolly and pivotally engaging a rear end of said load carrying beam; a forward beam lifting means supported on the jeep at a predetermined position between the axle clusters of said jeep and said truck means, and pivotally engaging a forward end of said beam; whereby on actuating said lifting means said massive load may be lifted off the platform means by the load carrying beam to distribute the load in a predetermined manner on each of said truck, jeep, and dolly axle clusters, regardless of the relative movement of said truck, jeep, and dolly with respect to said load carrying beam.

References Cited in the file of this patent

UNITED STATES PATENTS

| | | |
|---|---|---|
| 1,338,546 | Allen | Apr. 27, 1920 |
| 2,058,891 | Kellett | Oct. 27, 1936 |
| 2,351,151 | Sattler | June 13, 1944 |
| 2,373,398 | Hoobler | Apr. 10, 1945 |
| 2,590,962 | Gruton et al. | Apr. 1, 1952 |

FOREIGN PATENTS

| | | |
|---|---|---|
| 32,957 | Denmark | Mar. 17, 1924 |